(12) United States Patent
Lee et al.

(10) Patent No.: US 8,265,156 B2
(45) Date of Patent: Sep. 11, 2012

(54) VIDEO ENCODING/DECODING METHOD AND APPARATUS IN TEMPORAL DIRECT MODE IN HIERARCHICAL STRUCTURE

(75) Inventors: Kyo-hyuk Lee, Seoul (KR); Woo-jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1654 days.

(21) Appl. No.: 11/476,080

(22) Filed: Jun. 28, 2006

(65) Prior Publication Data

US 2007/0019730 A1    Jan. 25, 2007

Related U.S. Application Data

(60) Provisional application No. 60/700,335, filed on Jul. 19, 2005.

(30) Foreign Application Priority Data

Nov. 15, 2005  (KR) .................. 10-2005-0109265

(51) Int. Cl.
*H04N 7/12*   (2006.01)
*H04N 11/02*  (2006.01)
*H04N 11/04*  (2006.01)

(52) U.S. Cl. ................................. 375/240.16
(58) Field of Classification Search .............. 375/240.16
See application file for complete search history.

(56) References Cited

U.S. PATENT DOCUMENTS

| 6,427,027 B1 * | 7/2002 | Suzuki et al. | 382/236 |
| 6,907,075 B2 * | 6/2005 | Felts et al. | 375/240.19 |
| 7,233,621 B2 * | 6/2007 | Jeon | 375/240.15 |
| 2002/0097800 A1 * | 7/2002 | Ramanzin | 375/240.12 |
| 2004/0234143 A1 * | 11/2004 | Hagai et al. | 382/238 |

FOREIGN PATENT DOCUMENTS

| JP | 2003-319403 A | 11/2003 |
| KR | 2003-0024411 A | 3/2003 |
| KR | 2004-0008562 A | 1/2004 |
| KR | 1020040031556 A | 4/2004 |

OTHER PUBLICATIONS

Jiali Zheng, et al., "Extended direct mode for hierarchical B picture coding", In: Image Processing, 2005. ICIP 2005, IEEE International Conference on Publication Date: Sep. 11-14, 2005, pp. II 265-268, vol. 2.

(Continued)

*Primary Examiner* — Mehrdad Dastouri
*Assistant Examiner* — Jeremaiah Hallenbeck-Huber
(74) *Attorney, Agent, or Firm* — Sughrue Mion, PLLC (57) ABSTRACT

A video encoding/decoding method and apparatus in a temporal direct mode in a hierarchical structure. The video encoding method in the temporal direct mode in the hierarchical structure includes calculating a temporal position of a forward reference frame or a backward reference frame of a high-pass frame; searching for frames that exist at the temporal position and have motion vector information; if there is a plurality of frames searched for, selecting as a co-located frame a frame, among the plurality of frames, having a motion vector of which an interval is closest to a difference in interval between the forward reference frame and the backward reference frame of the high-pass frame, and extracting the motion vector of the selected frame; and encoding information on the selected frame so that the high-pass frame can use the extracted motion vector.

28 Claims, 10 Drawing Sheets

OTHER PUBLICATIONS

Xiangyang Ji, et al., "New bi-prediction techniques for B pictures coding [video coding]", In: Multimedia and Expo, 2004. ICME '04. 2004, IEEE International Conference on vol. 1, Jun. 27-30, 2004, pp. 101-104, vol. 1.

J.M. Boyce, "Weighted prediction in the H.264/MPEG AVC video coding standard", In: Circuits and Systems, 2004. ISCAS '04. Proceedings of the 2004 International Symposium on vol. 3, May 23-26, 2004, pp. III 789-792, vol. 3, Digital Object Identifier 10.1109/ISCAS.2004.1328865.

Markus Flierl, et al., "Generalized B pictures and the draft H.264/AVC video-compression standard", In: Circuits and Systems for Video Technology, IEEE Transactions on Publication Date: Jul. 2003, pp. 587-597, vol. 13, Issue 7.

* cited by examiner

(a) Case where B-frames exist in the same layer

FIG. 4B

(b) Case where B-frames form a hierarchical structure

VIDEO ENCODING/DECODING METHOD AND APPARATUS IN TEMPORAL DIRECT MODE IN HIERARCHICAL STRUCTURE

CROSS-REFERENCE TO RELATED APPLICATIONS

This application claims priority from Korean Patent Application No. 10-2005-0109265, filed on Nov. 15, 2005 in the Korean Intellectual Property Office, and U.S. Provisional Patent Application No. 60/700,335, filed on Jul. 19, 2005, the disclosures of which are incorporated herein by reference in their entireties.

BACKGROUND OF THE INVENTION

1. Field of the Invention

Methods and apparatuses consistent with the present invention relate to video encoding and decoding, and more particularly to a video encoding and decoding in a temporal direct mode in a hierarchical structure.

2. Description of the Prior Art

With the development of information and communication technologies including the Internet, multimedia communications are increasing in addition to text and voice communications. The existing text-centered communication systems are insufficient to satisfy consumers' diverse desires, and thus multimedia services that can accommodate diverse forms of information such as text, images, and music are increasing. Since multimedia data is large, mass storage media and wide bandwidths are respectively required for storing and transmitting it. Accordingly, compression coding techniques are required to transmit the multimedia data.

The basic principle of data compression is to remove redundancy. Data can be compressed by removing spatial redundancy such as a repetition of the same color or object in images, temporal redundancy such as similar adjacent frames in moving images or continuous repetition of sounds, and visual/perceptual redundancy, which considers human insensitivity to high frequencies. In a general video coding method, the temporal redundancy is removed by temporal filtering based on motion compensation, and the spatial redundancy is removed by a spatial transform.

Diverse methods for reducing such redundancies have been proposed. The temporal direct mode (TDM) is useful for B-frames. In the TDM, motion vectors are predicted, in consideration of the correlation between a B-frame and a reference frame, using motion vectors of either of two frames (e.g., forward reference frame and backward reference frame) that the B-frame refers to.

Figure 1:
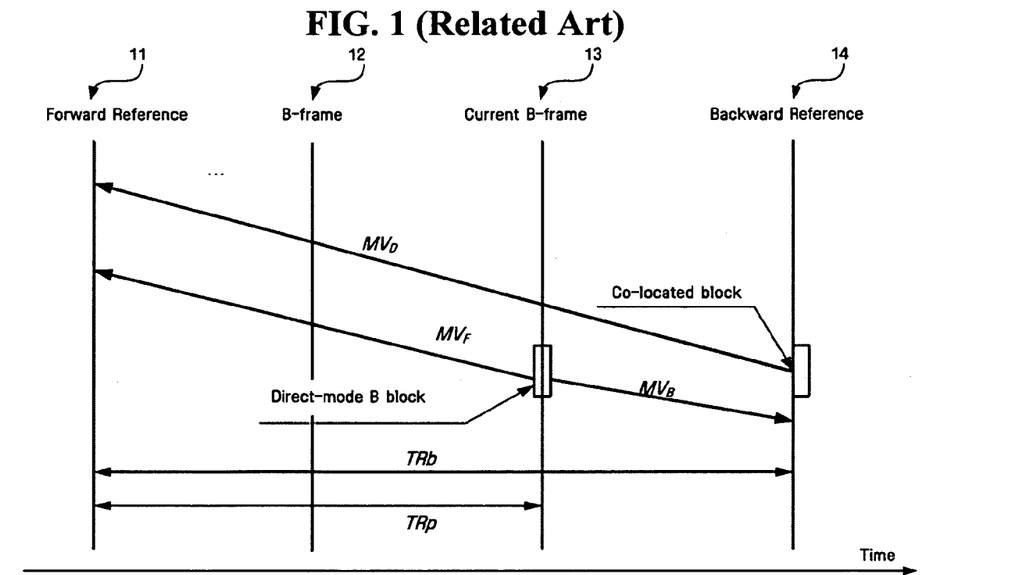
FIG. 1 is a view explaining a temporal direct mode.

FIG. 1 is a view explaining the TDM. In order to obtain motion vectors of the current B-frame 13, motion vectors $MV_F$ and $MV_B$ as expressed in Equation (1) are generated with reference to a motion vector $MV_D$ of a backward reference frame 14.

$$MV_F = \frac{TRp}{TRb} \times MV_D \quad (1)$$

$$MV_B = \frac{TRb - TRp}{TRb} \times MV_D \times (-1),$$

where TRb denotes the temporal distance between the forward and backward reference frames, and TRp denotes the temporal distance between the current B frame 12 and forward reference frame 11.

Since objects usually move in a uniform direction at a uniform speed, it is efficient to apply the TDM to the bidirectional B-frame. However, in the case of applying the TDM to a hierarchical B-frame, the efficiency may deteriorate when the distance between frames to be referred to is different from that between their left and right frames. Accordingly, a method and an apparatus are required which can apply a TDM to B-frames of a hierarchical structure in consideration of a picture order count (POC).

SUMMARY OF THE INVENTION

Accordingly, the present invention has been made to address the above-mentioned problems occurring in the prior art, and an aspect of the present invention is to provide an encoding/decoding method and an apparatus therefor in the temporal direct mode (TDM) in consideration of the characteristics of a hierarchical high-pass frame.

It is another aspect of the present invention to increase the efficiency of encoding in consideration of a POC in encoding a hierarchical high-pass frame in a temporal direct mode.

Additional aspects of the invention will be set forth in part in the description which follows and in part will become apparent to those having ordinary skill in the art upon examination of the following or may be learned from practice of the invention.

In order to accomplish these aspects, there is provided a video encoding method in a temporal direct mode in a hierarchical structure, which includes calculating a temporal position of a forward reference frame or a backward reference frame of a high-pass frame; searching for frames that exist at the temporal position and have motion vector information; if there is a plurality of frames found, selecting as a co-located frame a frame, among the plurality of frames, having a motion vector of which an interval is closest to a difference in interval between the forward reference frame and the backward reference frame of the high-pass frame, and extracting the motion vector of the selected frame; and encoding information on the selected frame.

In another aspect of the present invention, there is provided a video decoding method in a temporal direct mode in a hierarchical structure, which includes decoding temporal direct mode information on a high-pass frame in a received video signal; extracting information on a co-located frame and a co-located block using the decoded temporal direct mode information; transforming a motion vector of the co-located block in the co-located frame by comparing a temporal position of the motion vector with a temporal position of the high-pass frame; and restoring the high-pass frame using the transformed motion vector.

In still another aspect of the present invention, there is provided a video encoder for performing encoding in a temporal direct mode in order to predict a high-pass frame in a multilayer video signal, which includes a motion vector extraction unit which calculates at least one of a temporal position of a forward reference frame and a backward reference frame of the high-pass frame, and searches for frames existing at the temporal position and having motion vector information, and if a plurality of frames are found, the motion vector extraction unit selecting as a co-located frame a frame, among the plurality of frames, having a motion vector of which an interval is closest to a difference in interval between the forward reference frame and the backward reference frame of the high-pass frame, and extracting the motion vector of the selected frame; and a temporal direct-mode encoding unit which encodes information on the selected frame.

In still another aspect of the present invention, there is provided a video decoder, which includes a decoding unit which decodes temporal direct mode information on a high-pass frame of a received video signal; a motion vector extraction unit which extracts information on a co-located frame and a co-located block in the co-located frame using the decoded temporal direct mode information; and a restoration unit which transforms a motion vector of the co-located block in the co-located frame by comparing a temporal position of the motion vector with a temporal position of the high-pass frame, and restores the high-pass frame using the transformed motion vector.

BRIEF DESCRIPTION OF THE DRAWINGS

The above and other aspects of the present invention will become more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described in detail with reference to the accompanying drawings. The aspects and features of the present invention and methods for achieving the aspects and features will become apparent by referring to the exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

The present invention will be described with reference to the accompanying drawings illustrating block diagrams and flowcharts for explaining a video encoding/decoding method and an apparatus therefor in the temporal direct mode (TDM) of a hierarchical structure according to exemplary embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. Also, each block of the flowchart illustrations may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order, depending upon the functionality involved.

Figure 2:
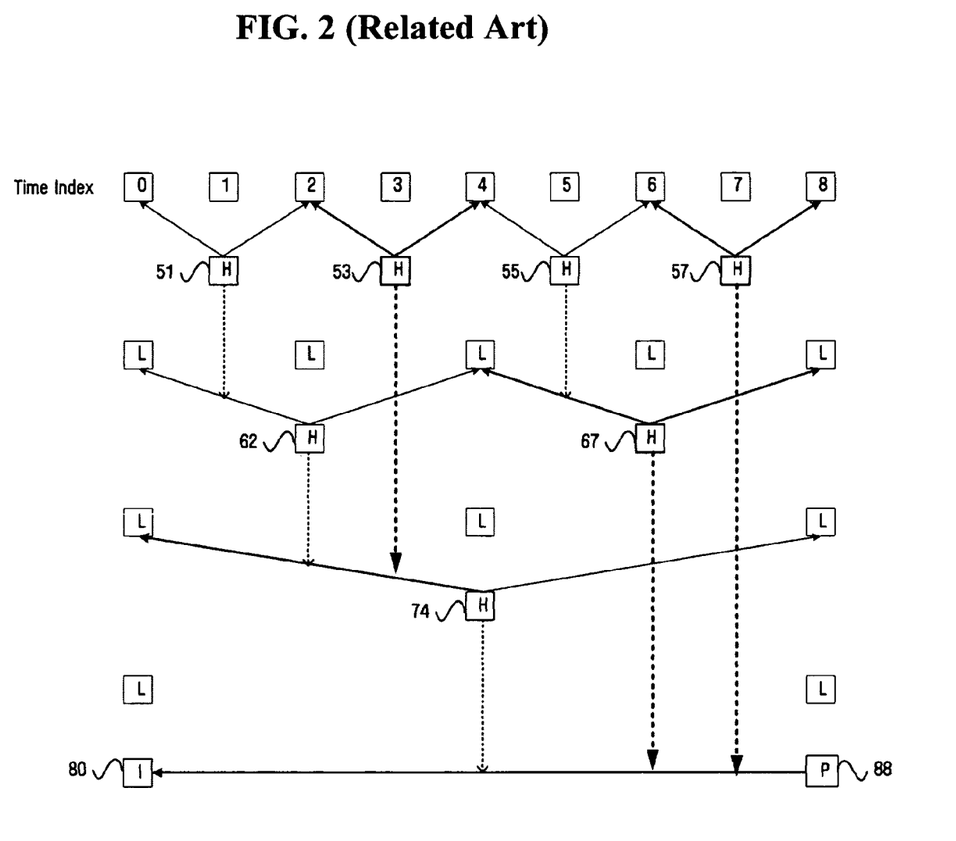
FIG. 2 is a view illustrating motion vectors that B-frames refer to in a temporal direct mode.

FIG. 2 is a view illustrating motion vectors that B-frames refer to in the TDM. In the following description, B-frames and H frames will be explained as examples of high-pass frames, but the present invention is not limited thereto. H frames 51, 53, 55 and 57 of time indexes 1, 3, 5 and 7 have residual data of their left and right frames, respectively. In the case of applying the TDM in order to obtain motion values of these frames, motion vectors that the H-frames of the time indexes 1, 3, 5 and 7 will use are considered as follows. The H-frame 51 of the time index 1 uses a motion vector of an H-frame 62 of a time index 2, and the H-frame 53 of the time index 3 uses a motion vector of an H-frame 74 of a time index 4. The H-frame 55 of the time index 5 uses a motion vector of an H-frame 67 of a time index 6, and the H-frame 57 of the time index 7 uses a motion vector of a P-frame 88 of a time index 8. An I-frame 80 is also shown.

In the same manner, the H-frame 62 of the time index 2 uses the motion vector of the H-frame 74 of the time index 4, and the H-frame 67 of the time index 6 uses the motion vector of the P-frame 88 of the time index 8. The H-frame 74 of the time index 4 uses the motion vector of the P-frame 88 of the time index 8. In FIG. 2, solid lines indicate the motion vectors of the corresponding frames, and dotted lines points to the motion vectors to be used when the TDM is applied.

Hereinafter, for explanatory convenience, the time index is represented as a picture order count (POC).

Referring to FIG. 2, it can be recognized that in the case of the H-frames 53, 67, and 57 of the POCs 3, 6, and 7, motion vectors to be used are greatly different from original motion vectors. The H-frame 53 of the POC 3 is a frame that refers to the time points of the POC 2 and POC 4, but in the case of applying the TDM thereto, it uses a motion vector that exists at POC 4 and refers to POC 0. Accordingly, the motion vector that is used under the TDM becomes different from the original motion vectors, and this may cause the coding efficiency to be lowered or the performance obtained by the TDM not to be realized as intended. In the same manner, the H-frame 67 of POC 6 and the H-frame 57 of POC 7 refer to the P-frame 88, which is quite different from the actual frames to be referred to.

A block having a motion vector to be used in order to apply the TDM thereto is called a co-located block. For example, co-located blocks of macroblocks at POCs 3, 6, and 7 are macroblocks at POCs 4, 8, and 8, respectively. As described above with reference to FIG. 2, the problems occur due to the great difference between the POC that the motion vector to be used refers to and the POC of the motion vector to be originally indicated in the current frame. A method to reduce the above-described difference will now be explained with reference to FIG. 3.

Figure 3:
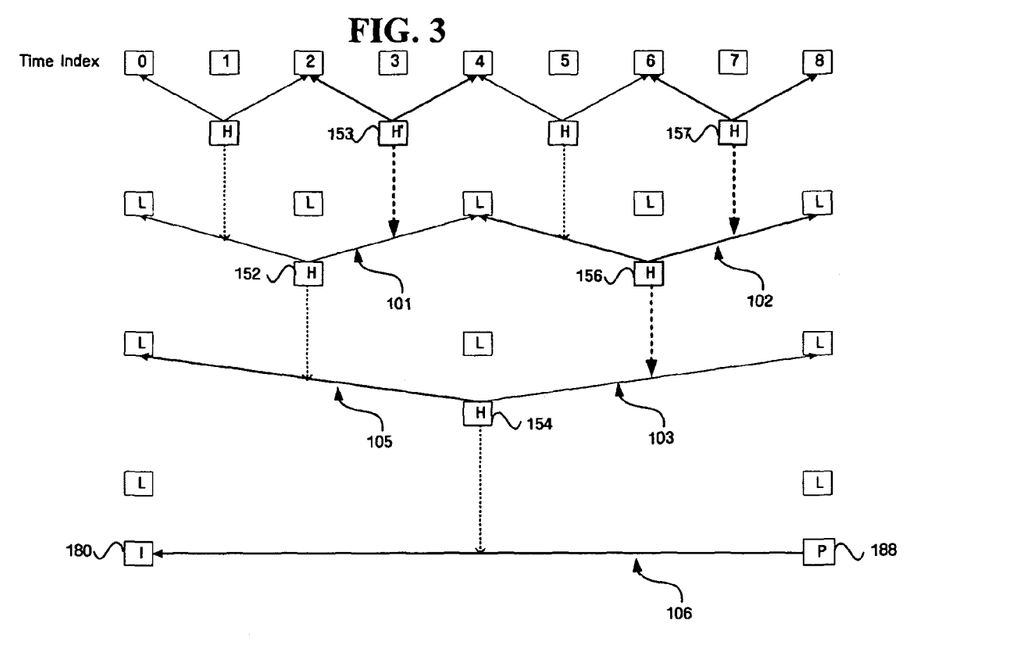
FIG. 3 is an exemplary view illustrating a hierarchical B-structure to which a temporal direct mode is efficiently applied according to an exemplary embodiment of the present invention.

FIG. 3 is an exemplary view illustrating a hierarchical B-structure to which the TDM is efficiently applied according to an exemplary embodiment of the present invention. The inconsistency as described above with reference to FIG. 2 is caused by the inconsistency between POCs. Accordingly, in selecting the co-located block in order to reduce the inconsistency, the object of the backward reference is not selected, but the object of the forward reference is selected as the co-located block, and the motion vector of the corresponding block is used.

An H-frame 153 of POC 3 may consider an H-frame 152 of POC 2 as its co-located block and consider a motion vector 101 as its motion vector that is used in the TDM. In this case, the accuracy is improved, and thus the coding efficiency can be heightened in comparison to the case in which the motion vector 105 is used as illustrated in FIG. 2.

In addition, an H-frame 156 of POC 6 may consider an H-frame 154 of POC 4 as its co-located block and consider a motion vector 103 as its motion vector that is used in the TDM. In this case, the accuracy is improved, and thus the coding efficiency can be heightened in comparison to the case in which the motion vector 106 is used as illustrated in FIG. 2.

In addition, an H-frame 157 of POC 7 may consider an H-frame 156 of POC 6 as its co-located block and consider a motion vector 102 as its motion vector that is used in the TDM. In this case, the accuracy is improved, and thus the coding efficiency can be heightened in comparison to the case in which the motion vector 106 is used as illustrated in FIG. 2.

Specifically, as shown in FIG. 3, if the efficiency deteriorates in applying the TDM by selecting the co-located block through the backward reference frame, for example, if the POCs of the motion vectors are inconsistent with each other and thus it is difficult to ensure the accuracy of the motion vector, the co-located block can be selected through the forward reference frame. In the same manner, if the efficiency deteriorates in applying the TDM by selecting the co-located block through the forward reference frame, the co-located block can be selected through the backward reference frame.

Accordingly, by designating the first element of the zeroth reference frame list refPic list0, unlike the conventional method that designates the first element of the first reference frame list refPic list1 to the co-located frame and the co-located block, the motion to be used through the TDM can be derived. Accordingly, the TDM can be applied so that the POCs are consistent with each other, and thus the coding efficiency can be heightened.

Figure 4A:
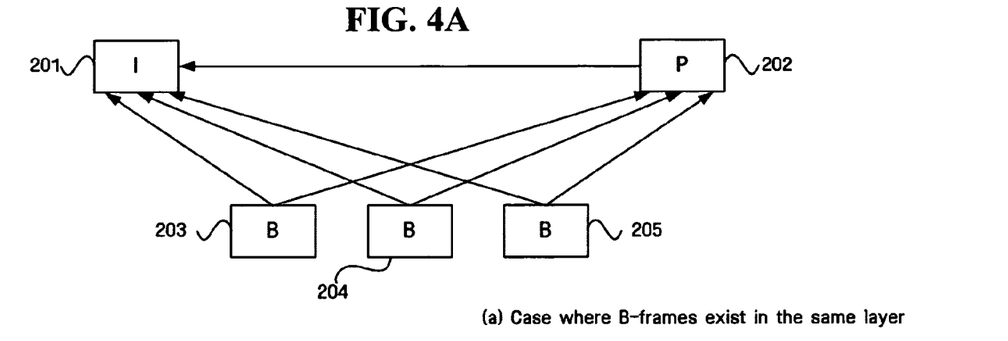
FIGS. 4A and 4B are exemplary views illustrating motion vectors that B-frames refer to according to an exemplary embodiment of the present invention.
Figure 4B:
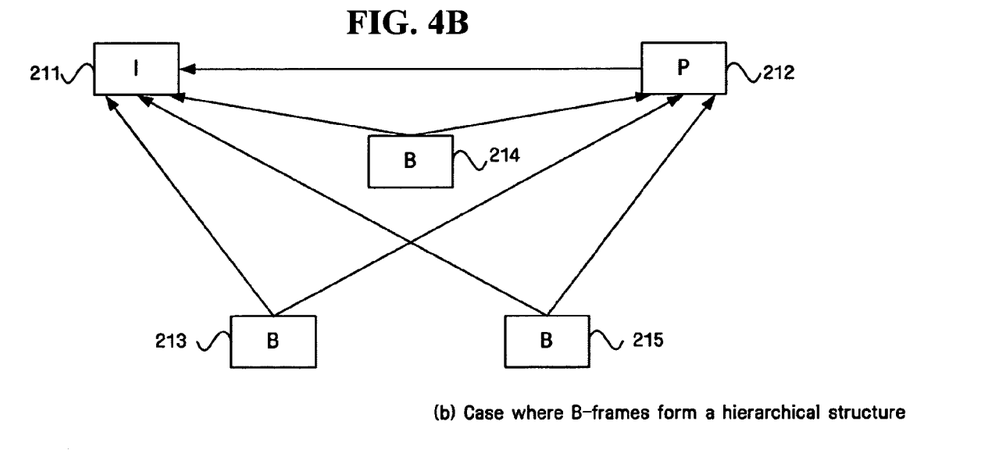

FIGS. 4A and 4B are exemplary views illustrating motion vectors that B-frames refer to according to an exemplary embodiment of the present invention. FIG. 4A shows a case where B-frames exist in the same layer. In this case, the B-frames 203, 204, and 205 use motion vectors of an I-frame 201 and a P-frame 202 in the base layer.

In a case where a B-frame 214 exists in an intermediate enhancement layer in a hierarchical B-structure, which also includes B-frames 213 and 215, as shown in FIG. 4B, it is not reasonable to use an I-frame 211 and a P-frame 212 in the base layer. Accordingly, the TDM may be applied to the B-frame of the enhancement layer in the hierarchical B-structure.

Figure 5:
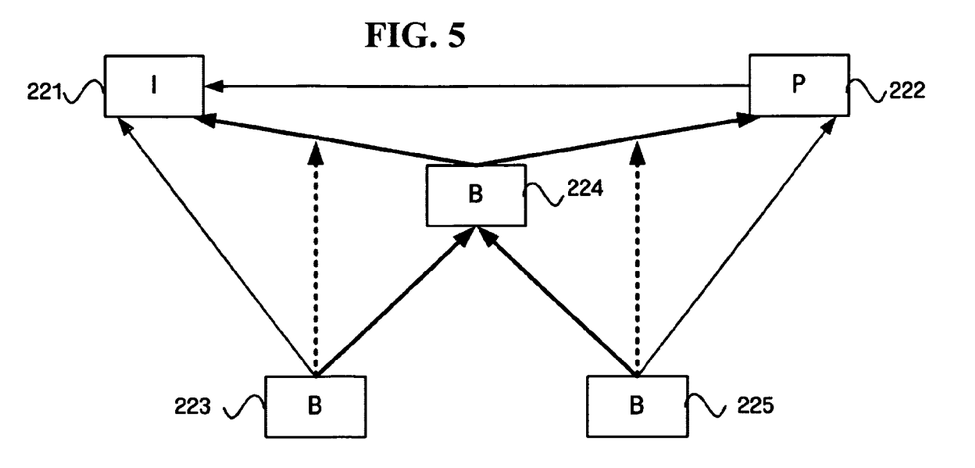
FIG. 5 is an exemplary view illustrating motion vectors of an enhancement layer used when a temporal direct mode is applied to a hierarchical B-structure according to an exemplary embodiment of the present invention.

FIG. 5 is an exemplary view illustrating motion vectors of an enhancement layer used when the TDM is applied to a hierarchical B-structure according to an exemplary embodiment of the present invention. In FIG. 5, an I-frame 221 and a P-frame 222 exist as frames of the base layer, and B-frames 223, 224, and 225 exist in the enhancement layer, among which a layer is constructed. The B-frame 225 considers the B-frame 224 of the lower layer as its co-located frame, and uses the motion vector of the B-frame 224 rather than uses the I-frame 221 as shown in FIG. 4.

Since the TDM is applied through the use of the motion vector of the B-frame 224 of the lower layer that does not have a great temporal difference, the size of residual data is reduced, and the efficiency is improved.

In selecting a co-located block having a motion vector to be referred to as shown in FIGS. 2 to 5, the application efficiency of the TDM can be heightened by selecting a frame which exists at a position that is most temporally similar to the current frame. Since the TDM is to divide motion vectors according to time indexes, the predicted performance is improved when the difference between the time index of a referring frame and the time index of a frame being referred to is small or a frame being referred to exists near the time index of the frame being actually referred to.

Figure 6:
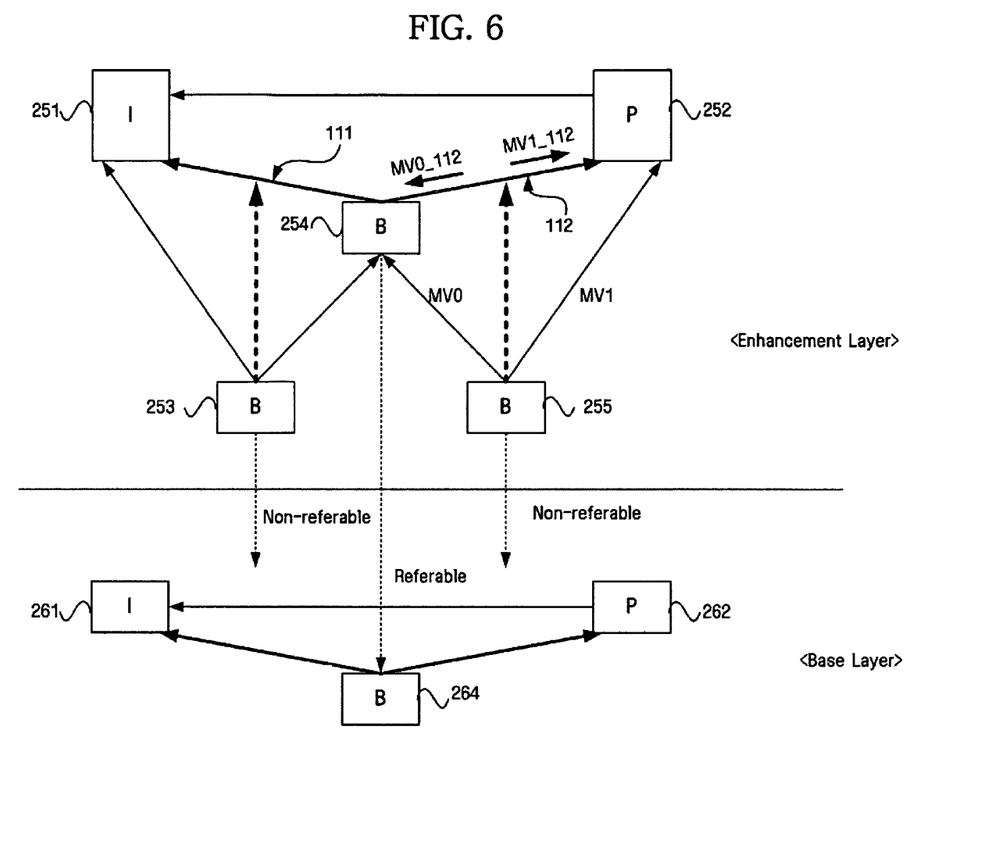
FIG. 6 is an exemplary view explaining the application of the temporal direct mode to the motion prediction of B-frames of an enhancement layer according to an exemplary embodiment of the present invention.

FIG. 6 is an exemplary view explaining the application of the TDM to a process of performing a motion prediction on B-frames of an enhancement layer.

A motion prediction of a B-frame in an enhancement layer can be performed with reference to a motion vector of a lower layer such as a base layer. However, with respect to a frame of the enhancement layer that does not exist in the base layer, the motion prediction based on the base layer cannot be performed. In this case, the motion vector can be predicted in the above-described TDM method, and thus its residual can be calculated.

In FIG. 6, since the POC of the B-frame 254 among the B-frames, 253, 254, and 255 of the enhancement layer is the same as that of the B-frame 264 of the base layer, the motion prediction can be performed with reference to the B-frame 264. However, there exists no base-layer frame that corresponds to the B-frames 253 and 255 having the same POC. In this case, the motion vector of the B-frame 254 into halves, as in the above-described TDM application method. For example, if motion vectors obtained by dividing the backward motion vector 112 by halves are MV0_112 and MV1_112, the forward and backward motion vectors MV0 and MV1 of the B-frame 255 can be calculated by calculating the residuals of the motion vectors MV0_112 and MV1_112, respectively. Also shown are motion vector 111, I-frames 251 and 261, and P-frames 252 and 262.

Figure 7:
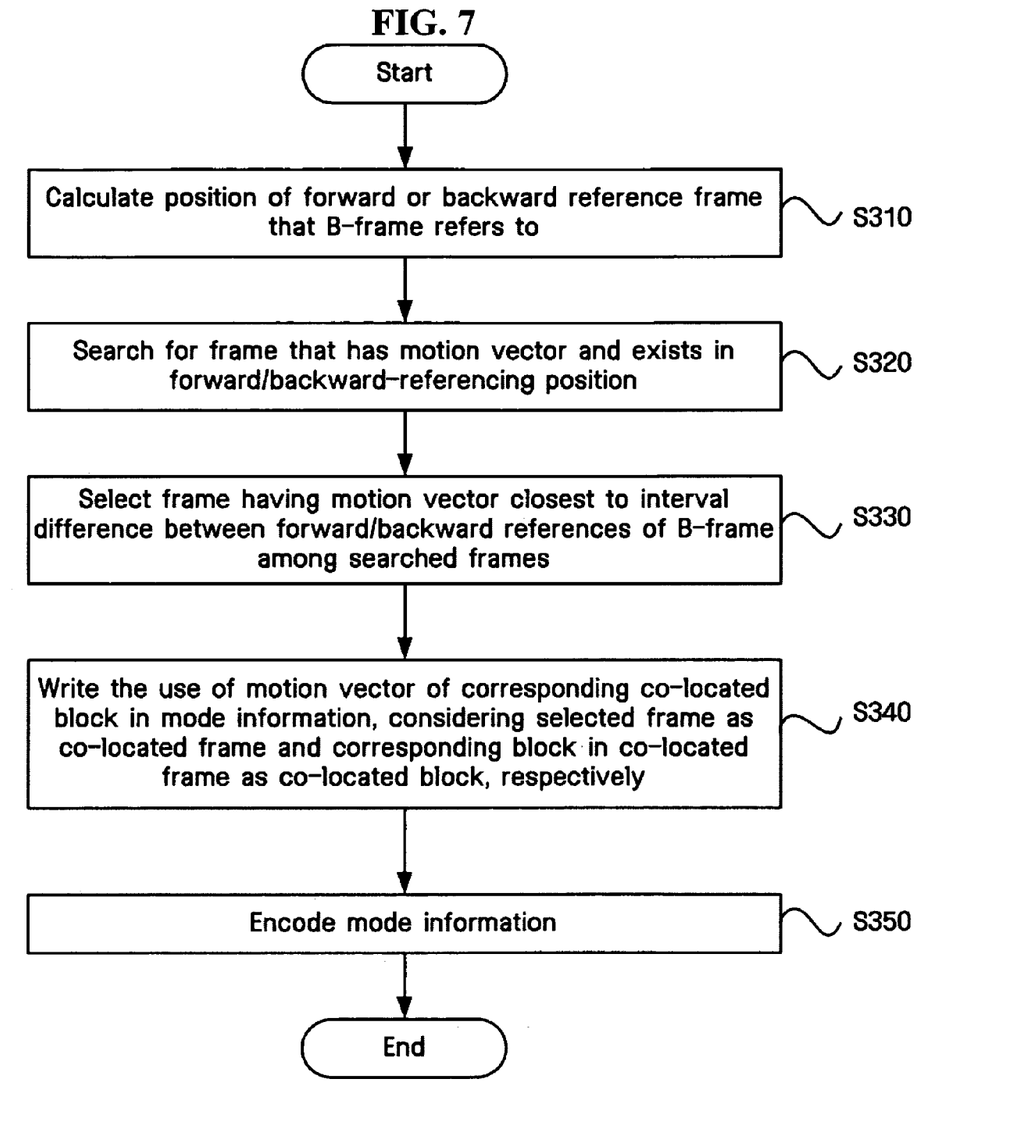
FIG. 7 is a flowchart illustrating a video encoding process according to an exemplary embodiment of the present invention.

FIG. 7 is a flowchart illustrating a video encoding process according to an exemplary embodiment of the present invention.

The position of the forward reference frame or the backward reference frame, which the B-frame refers to in the hierarchical B-structure, is calculated S310. For example, in FIG. 3, the position of the forward reference frame of the H-frame 153 is POC 2, and the position of the backward reference frame is POC 4. Frames having motion vectors and existing in the position of the forward or backward reference frame are searched for S320. For example, two H-frames that are frames existing at POC 2 and POC 4, as described above, are searched for. One of motion vectors of the two searched H-frames, of which the POC difference is closest to the difference in interval between the forward and backward references of the H-frame 153, is selected S330. In the H-frame 153 of FIG. 3, the difference between the POCs of the forward and backward references is two POCs.

The motion vector of the H-frame 152 of POC 2 refers to the frame of POC 4, and thus the difference between the POCs is two POCs. By contrast, the motion vector of the H-frame 154 of POC 4 refers to the frame of POC 0, and thus the difference between the POCs is four POCs. Accordingly, from the viewpoint of the H-frame 153 to be encoded, the H-frame 152 can provide a more accurate motion vector 101 to the H-frame 153, and thus it is selected. In order to use the motion vector of the selected/searched frame, the selected frame is considered as a co-located frame colPic, and the corresponding block in the selected frame is considered as a co-located block. In this case, it is written in mode information that the motion vector of the corresponding co-located block is used. If information notifying that the TDM, such as MODE_SKIP, is used is written, the decoder side can divide and use the motion vector of the corresponding co-located block. The H-frame 153 of POC 3 uses vectors obtained by dividing a motion vector 101 to be used into halves.

Then, the mode information is encoded S350.

The above-described process is also applicable to the case as illustrated in FIG. 5. In the case of the B-frame 225 of FIG. 5, it does not refer to the motion vector of the P-frame 222, but uses the backward motion vector of the B-frame 224 that exists in the enhancement layer. The backward motion vector of the B-frame 224 is consistent with the POC interval of the B-frame 225, but there is a wide difference between the forward motion vector of the P-frame and the POC interval of the B-frame. Accordingly, by selecting the B-frame 224 as the co-located block and encoding only information on the motion vector to be used according to the TDM, the decoder side can divide and use the corresponding motion vector.

In step S320, if the reference range of the POC that the block to be currently encoded is referring to is different from that of the motion vector to be brought according to the TDM, the inconsistency occurs when the brought motion vector is used. In this case, the co-located frame and the co-located block that have the motion vector to be used are selected by searching for motion vectors having the same reference range, and the selection of the co-located frame and the co-located block is set in a flag such as colPic to encode the corresponding information.

In the case of the B-frame as illustrated in FIG. 6, unlike the case where the motion vectors are used as illustrated in FIGS. 3 and 5, the motion vector to be used in the TDM is not used as it is, but the motion vector is predicted to generate the residual data. Accordingly, after step S340, the residual data is generated from two motion vectors obtained by dividing the selected motion vector according to the POC.

Figure 8:
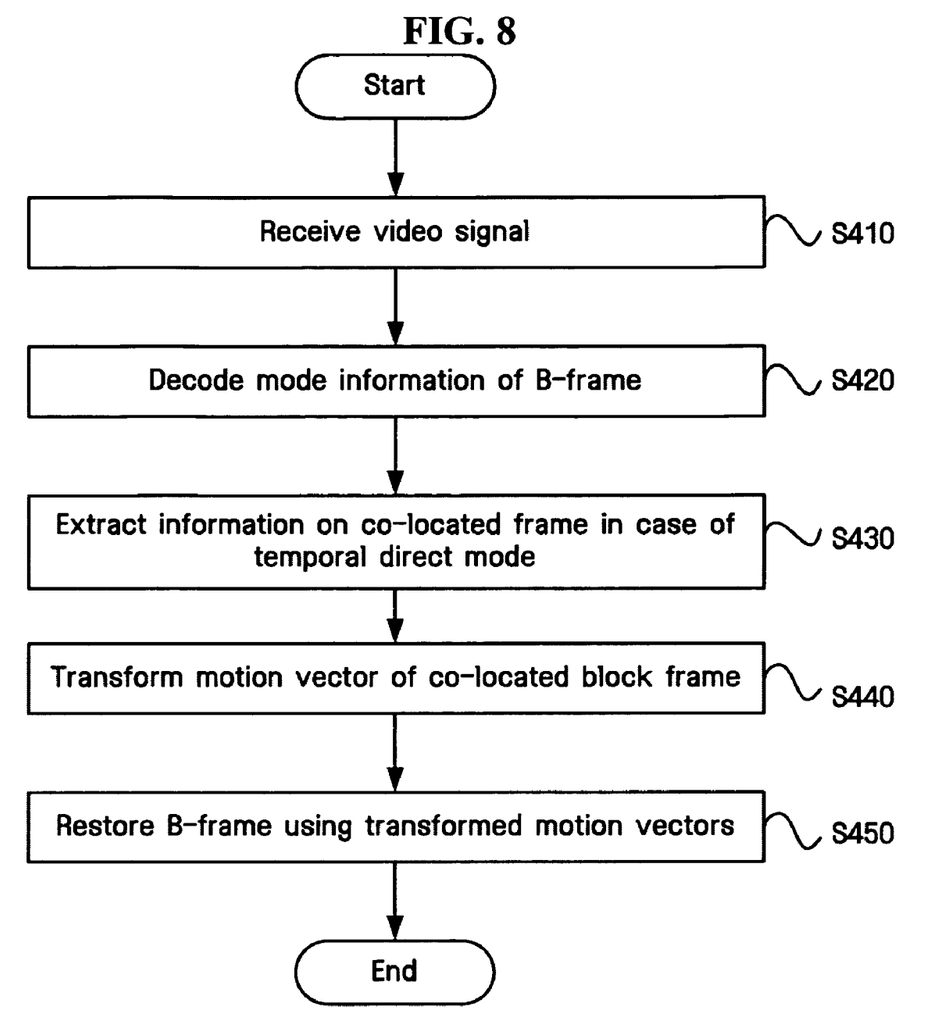
FIG. 8 is a flowchart illustrating a video decoding process through the application of a temporal direct mode according to an exemplary embodiment of the present invention.

FIG. 8 is a flowchart illustrating a video decoding process through the application of the TDM according to an exemplary embodiment of the present invention.

In the case of decoding a B-frame from a received video sequence in a decoder, the B-frame was encoded in the TDM, data of a co-located block that has a motion vector to be referred to in the TDM is extracted, and a process of restoring the original data is performed using motion vectors obtained by dividing the motion vector of the corresponding co-locate block in a specified ratio (e.g., into halves) according to the POC.

A video signal is received S410. The video signal may be a video signal received through a network, or may be video content stored in a storage medium. Then, the mode information on a B-frame of the received video signal is decoded S420. In the case where the mode information is in the TDM, information on the co-located frame (e.g., colPic) is extracted S430. Then, the motion vector that the co-located block frame has is transformed on the basis of the temporal position of the B-frame to be restored S440, and the B-frame is restored using the transformed motion vector S450.

On the other hand, in the case of the B-frame as illustrated in FIG. 6, unlike the case where the motion vectors are used as illustrated in FIGS. 3 and 5, the motion vector to be used in the TDM is not used as it is, but the motion vector is predicted to generate the residual data. Accordingly, in step S420, the residual data is decoded in addition to the mode information. After the step S450, the B-frame can be restored by generating predicted data, using the two motion vectors obtained by dividing the selected motion vector according to the POC, and by generating the corresponding residual data.

In the exemplary embodiment of the present invention, the term "unit", that is, "module" or "table", as used herein, means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented so as to execute one or more CPUs in a device.

Figure 9:
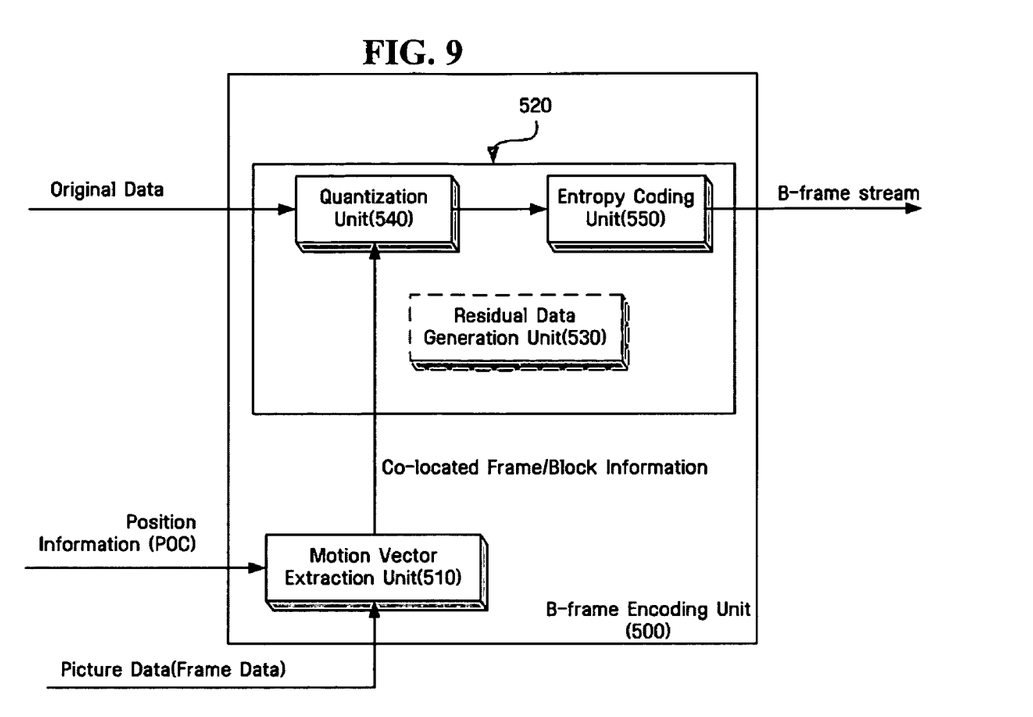
FIG. 9 is a block diagram illustrating the construction of a B-frame encoding unit for encoding B-frames in a video encoder according to an exemplary embodiment of the present invention.

FIG. 9 is a block diagram illustrating the construction of a B-frame encoding unit for encoding B-frames in a video encoder according to an exemplary embodiment of the present invention. Since the process of encoding I and P-frames is well known in the art, the detailed explanation thereof will be omitted.

The B-frame encoding unit 500 includes a motion vector extraction unit 510, a temporal direct-mode encoding unit 520, a residual data generation unit 530, a quantization unit 540, and an entropy coding unit 550.

The motion vector extraction unit 510 calculates the temporal position of a forward reference frame or backward reference frame of a high-pass frame, and searches for frames that exist at the position and have motion vector information. If the searched frames are plural, the motion vector extraction unit 510 selects as a co-located frame a candidate frame having a motion vector of which the POC difference is closest to the difference in interval between the forward reference frame and the backward reference frame of the high-pass frame.

The motion vector extraction unit 510 calculates the temporal position of the high-pass frame, and searches for the first frame that exists at the forward-referencing position of the high-pass frame. In this case, the first frame may be the first element of the zeroth reference frame list refPic list0.

Also, the motion vector extraction unit 510 can remove the inconsistency between POCs by searching for frames which are consistent with two POC values that can be derived from motion vectors, a POC value of a backward-referencing frame of the high-pass frame, and a POC value of a forward-referencing frame of the high-pass frame. The motion vector extraction unit 510 can also calculate the temporal position, search for the first frame of the enhancement layer that exists at a forward or backward-referencing position of the high-pass frame, and extract the motion vector by considering the first frame as the co-located block.

In addition, the motion vector extraction unit 510 obtains position information such as POCs of the forward reference frame and the backward reference frame of the B-frame to be currently encoded using position information, for example, time index or POC information in the case of the TDM. The motion vector extraction unit 510 searches for the frame which has motion vector information among frames at the reference position through the position information and is a candidate for the co-located frame. In this case, as shown in FIG. 3 or 5, the motion vector extraction unit 510 selects a frame, having a motion vector whereby an interval between a frame that has the motion vector and a frame that is referred to by the motion vector, among candidate frames, is consistent with or similar to an interval between the actual forward and backward reference frames.

The motion vector extraction unit 510 may consider the difference in interval between motion vectors of the candidate frames as a reference for selecting a co-located block. For example, in the case of encoding the H-frame 157 in FIG. 3, an H-frame 156 and a P-frame 188 may be the candidate frames. An I-frame 180 is also shown. In this case, the H-frame 156 provides a motion vector referring to the frame of POC 8, and thus has a POC difference of two POCs, while the P-frame 188 provides a motion vector referring to the frame of POC 0, and thus has a POC difference of eight POCs. Since the interval between the forward and backward reference frames of the H-frame to be encoded is two POCs, it is more suitable to apply the TDM to the H-frame 156.

Information on the co-located frame and the co-located block, which is information on the motion vector selected by the motion vector extraction unit 510, is transferred to the temporal direct-mode encoding unit 520, and encoded by the quantization unit 540 and the entropy coding unit 550 that are included in the temporal direct-mode encoding unit 520. The encoded information is transferred to the decoder side.

The temporal direct-mode encoding unit 520 may further include the residual data generation unit 530 in order to satisfy the TDM type motion prediction process as illustrated in FIG. 6.

The residual data generation unit 530 in the temporal direct-mode encoding unit 520 transforms the motion vector into two motion vectors according to the temporal position of the high-pass frame, generates predicted data using the two transformed motion vectors, and calculates the residual data using the predicted data.

In this case, after the residual data generation unit 530 obtains the motion vectors for generating the predicted data, it transforms the motion vector extracted by the motion vector extraction unit 510, and generates the predicted data by performing a prediction according to the TDM.

The residual data generation unit 530 generates the residual data by calculating the residual between the predicted data and the original video signal of the B-frame to be encoded. The quantization unit 540 quantizes the residual data, and the entropy coding unit 550 performs entropy coding of the quantized residual data to complete the encoding process. The encoded B-frame is included in the video stream to be transmitted to the decoder.

In the exemplary embodiment as illustrated in FIG. 3, the motion vector extraction unit 510 calculates the temporal position of the B-frame to be encoded, searches for the frame existing in the forward-referencing position of the B-frame to be encoded, and extracts the motion vector by considering the searched frame as the co-located block.

In the exemplary embodiment as illustrated in FIG. 5, the motion vector extraction unit 510 calculates the temporal position of the B-frame to be encoded, searches for the frame of the lower layer existing in the forward or backward-referencing position of the B-frame to be encoded, and extracts the motion vector by considering the searched frame as the co-located block.

In the exemplary embodiment as illustrated in FIG. 6, since a frame having the same temporal position (POC) does not exist in the lower layer of the B-frame to be encoded, the motion vector extraction unit 510, in order to apply the TDM to the B-frame, searches for the frame existing in the forward or backward-referencing position of the B-frame to be encoded, and extracts the motion vector by considering the searched frame as the co-located block.

Figure 10:
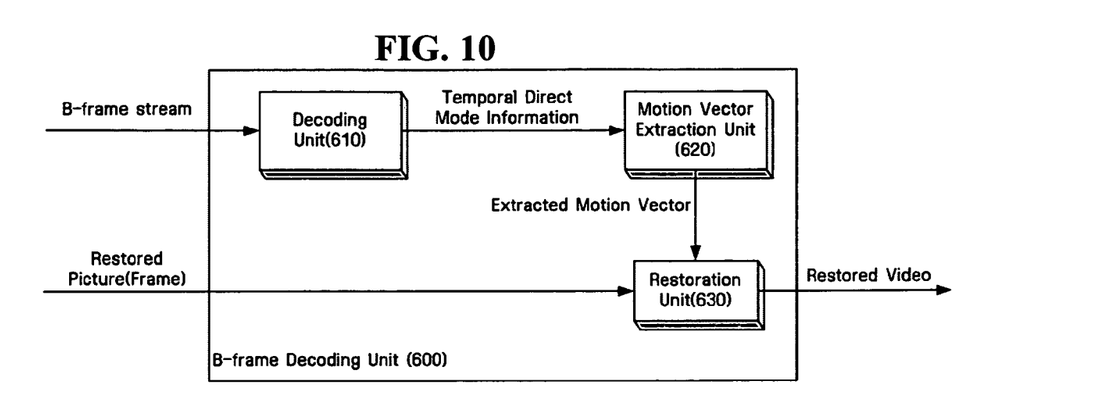
FIG. 10 is a block diagram illustrating the construction of a B-frame decoding unit for decoding B-frames in a video decoder according to an exemplary embodiment of the present invention.

FIG. 10 is a block diagram illustrating the construction of a B-frame decoding unit for decoding B-frames in a video decoder according to an exemplary embodiment of the present invention. Since the process of decoding I and P-frames is well known in the art, the detailed explanation thereof will be omitted.

The B-frame decoding unit 600 includes a decoding unit 610, a motion vector extraction unit 620, and a restoration unit 630. The decoding unit decodes the TDM information on the high-pass frame existing in the received video signal. The B-frame decoding unit can also decode the residual data.

The motion vector extraction unit 620 extracts information on the co-located frame and the co-located block using the decoded TDM information. The motion vector extraction unit extracts the motion vector by considering the first frame as the co-located frame and considering the block corresponding to the first frame as the co-located block. The first frame may be the first element of the zeroth reference frame list refPic list0.

The restoration unit transforms the motion vector by comparing the temporal position of the motion vector of the co-located block of the co-located frame with the temporal position of the high-pass frame, and restores the high-pass frame using the transformed motion vector.

The restoration unit transforms the extracted motion vector into two motion vectors according to the temporal position of the high-pass frame. Here, the co-located frame may be a frame in a backward-referencing position or a forward reference frame on the basis of the temporal position of the frame.

In order to implement the process as illustrated in FIG. 6, the high-pass frame is considered as a high-pass frame which has no frame having the same temporal position in the lower layer. The decoding unit 610 decodes the residual data. The restoration unit 630 transforms the motion vector into two motion vector according to the temporal position of the high-pass frame, generates predicted data using the two transformed motion vectors, and performs the restoration by adding the decoded residual data to the predicted data.

As described above, according to the exemplary embodiments of the present invention, a co-located block of a hierarchical B-frame can be selected in consideration of the temporal position of the B-frame when encoding the B-frame in the TDM.

In addition, the encoding efficiency in the TDM can be improved.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A video encoding method in a temporal direct mode in a hierarchical structure, comprising:
   obtaining a temporal position of at least one of a forward reference frame and a backward reference frame of a high-pass frame;
   searching for at least one frame which exists at the temporal position and has motion vector information;
   finding plural frames for at least one high pass frame and selecting as a co-located frame a frame, among the plural frames, having a motion vector of which an interval is closest to a difference in interval between the forward reference frame and the backward reference frame of the high-pass frame, and extracting the motion vector of the selected frame; and
   encoding information on the selected frame,
   wherein the interval of the motion vector is a difference between a picture order count (POC) of a frame which has the motion vector and a POC of a frame which is referred to by the motion vector,
   wherein the difference in interval between the forward reference frame and the backward reference frame of the high-pass frame is a difference of a POC of the forward reference frame of the high-pass frame and a POC of the backward reference frame of the high-pass frame, and
   wherein the selecting of the co-located frame comprises determining which frame among the plural frames has the motion vector, the interval of which has a POC difference that is closest to the difference of the POC of the forward reference frame of the high-pass frame and the POC of the backward reference frame of the high-pass frame.

2. The video encoding method of claim 1,
   wherein the selected frame is a first frame existing at a forward-referencing position of the high-pass frame, and
   wherein the extracted motion vector is a motion vector of a co-located block which is included in the co-located frame.

3. The video encoding method of claim 2, wherein the first frame is a first element of a zeroth reference frame list (refPic list0) or a first reference frame list (refPic list1).

4. The video encoding method of claim 1, wherein the encoding comprises extracting two motion vectors by transforming the extracted motion vector according to a temporal position of the high-pass frame.

5. The video encoding method of claim 1,
   wherein the high-pass frame does not contain a frame having the same temporal position in a lower layer of the frame,
   wherein after extracting the motion vector, the method further comprises transforming the motion vector into two motion vectors according to a temporal position of the high-pass frame, generating predicted data using the two transformed motion vectors, and calculating residual data using the predicted data, and
   wherein, in the encoding of the information on the selected frame, the information on the selected frame comprises the residual data.

6. The video encoding method of claim 1,
   wherein the selected frame is a first frame of an enhancement layer existing in a forward or backward-referencing position of the high-pass frame, and
   wherein the extracted motion vector is a motion vector of a co-located block, and the first frame is set as the co-located block.

7. The video encoding method of claim 1, wherein the interval of the motion vector is a difference between a temporal position of the selected frame and a temporal position of a first frame which is referred to by the selected frame.

8. A video decoding method in a temporal direct mode in a hierarchical structure for decoding a received video signal which is encoded according to the video encoding method of claim 1, the video decoding method comprising:
   decoding temporal direct mode information on a high-pass frame in the received video signal;
   extracting information on a co-located frame and a co-located block in the co-located frame using the decoded temporal direct mode information;
   transforming a motion vector of the co-located block in the co-located frame by comparing a temporal position of the motion vector with a temporal position of the high-pass frame; and
   restoring the high-pass frame using the transformed motion vector.

9. The video decoding method of claim 8, wherein the co-located frame is a first frame existing at a forward-referencing position of the high-pass frame.

10. The video decoding method of claim 9, wherein the first frame is a first element of a zeroth reference frame list (refPic list0) or a first reference frame list (refPic list1).

11. The video decoding method of claim 8, wherein the transforming of the motion vector of the co-located block comprises transforming the motion vector into two motion vectors according to a temporal position of the high-pass frame.

12. The video decoding method of claim 8,
    wherein the high-pass frame does not contain a frame having the same temporal position in a lower layer of the frame,
    wherein the decoding step includes decoding residual data, and
    wherein after extracting the information on the co-located frame and a co-located block, the method further comprises:
       transforming the motion vector into two motion vectors according to a temporal position of the high-pass frame;
       generating predicted data and residual data using the two transformed motion vectors; and
       restoring the high-pass frame by adding the residual data to the predicted data.

13. The video decoding method of claim 8, wherein the co-located frame is a frame existing at a forward-referencing position based on a temporal position of the high-pass frame.

14. The video decoding method of claim 8, wherein the co-located frame is a frame of an enhancement layer existing at a forward or backward-referencing position based on a temporal position of the high-pass frame.

15. A video encoder for performing encoding in a temporal direct mode in order to predict a high-pass frame in a multi-layer video signal, the video encoder comprising:
    a motion vector extraction unit which obtains at least one of a temporal position of a forward reference frame and a backward reference frame of the high-pass frame, and searches for at least one frame existing at the temporal position and having motion vector information,
    wherein, the motion vector extraction unit finds a plurality of frames for at least one high pass frame and the motion vector extraction unit selects as a co-located frame a frame, among the plurality of frames, having a motion vector of which an interval is closest to a difference in interval between the forward reference frame and the backward reference frame of the high-pass frame, and extracts the motion vector of the selected frame; and a temporal direct-mode encoding unit which encodes information on the selected frame, wherein the interval of the motion vector is a difference between a picture order count (POC) of a frame which has the motion vector and a POC of a frame which is referred to by the motion vector, and wherein the difference in interval between the forward reference frame and the backward reference frame of the high-pass frame is a difference of a POC of the forward reference frame of the high-pass frame and a POC of the backward reference frame of the high-pass frame, wherein the selecting of the co-located frame comprises determining which frame among the plural frames has the motion vector, the interval of which has a POC difference that is closest to the difference of the POC of the forward reference frame of the high-pass frame and the POC of the backward reference frame of the high-pass frame.

16. The video encoder of claim 15, wherein the selected frame is a first frame existing at a forward-referencing position of the high-pass frame, and wherein the extracted motion vector is a motion vector of a co-located block which is included in the co-located frame.

17. The video encoder of claim 16, wherein the first frame is a first element of a zeroth reference frame list (refPic list0) or a first reference frame list (refPic list1).

18. The video encoder of claim 15, wherein the temporal direct-mode encoding unit extracts two motion vectors by transforming the extracted motion vector according to a temporal position of the high-pass frame.

19. The video encoder of claim 15, wherein the high-pass frame does not have a frame having the same temporal position in a lower layer of the frame, and wherein the temporal direct-mode encoding unit transforms the motion vector into two motion vectors according to a temporal position of the high-pass frame, generates predicted data using the two transformed motion vectors, and calculates residual data using the predicted data.

20. The video encoder of claim 15, wherein the selected frame is a first frame of an enhancement layer existing at a forward or backward-referencing position of the high-pass frame, and wherein the extracted motion vector is a motion vector of a co-located block, and the first frame is set as the co-located block.

21. The video encoder of claim 15, wherein the interval of the motion vector is a difference between a temporal position of the selected frame and a temporal position of a first frame which is referred to by the selected frame.

22. A video decoder which receives a video signal encoded by the video encoder of claim 8, the video decoder comprising:

a decoding unit which decodes temporal direct mode information on a high-pass frame of the received video signal;

a motion vector extraction unit which extracts information on a co-located frame and a co-located block in the co-located frame using the decoded temporal direct mode information; and a restoration unit which transforms a motion vector of the co-located block in the co-located frame by comparing a temporal position of the motion vector with a temporal position of the high-pass frame, and restores the high-pass frame using the transformed motion vector.

23. The video decoder of claim 22, wherein the co-located frame is a first frame existing at a forward-referencing position of the high-pass frame.

24. The video decoder of claim 23, wherein the first frame is a first element of a zeroth reference frame list (refPic list0) or a first reference frame list (refPic list1).

25. The video decoder of claim 22, wherein the restoration unit transforms the motion vector into two motion vectors according to a temporal position of the high-pass frame.

26. The video decoder of claim 22, wherein the high-pass frame does not have a frame having the same temporal position in a lower layer of the frame, wherein the decoding unit decodes residual data, and wherein the restoration unit transforms the motion vector into two motion vectors according to a temporal position of the high-pass frame, generates predicted data and residual data using the two transformed motion vectors, and restores the high-pass frame by adding the residual data to the predicted data.

27. The video decoder of claim 22, wherein the co-located frame is a frame existing at a forward-referencing position based on a temporal position of the high-pass frame.

28. The video decoder of claim 22, wherein the co-located frame is a frame of an enhancement layer existing at a forward or backward-referencing position based on a temporal position of the high-pass frame.

* * * * *